United States Patent Office 3,184,442
Patented May 18, 1965

3,184,442
PROCESS FOR POLYMERIZATION UTILIZING A ZIEGLER CATALYST PROMOTED BY CADMIUM, MERCURY, TIN OR LEAD
Roger M. Nagel, Pennington, and Maigonis Gabliks, New Brunswick, N.J., assignors to Petro-Tex Chemical Corporation, Houston, Tex., a corporation of Delaware
No Drawing. Filed Apr. 10, 1961, Ser. No. 101,649
8 Claims. (Cl. 260—93.7)

This invention relates to the polymerization of α-olefins and relates more particularly to an improved method for polymerizing α-olefins containing 3 to 4 carbon atoms with a titanium halide, a trialkyl aluminum compound and certain metals.

Olefins such as ethylene have been polymerized to high molecular weight solid polymers with titanium halides such as titanium tetrachloride and alkyl aluminum compounds. Such catalyst systems have not been satisfactorily employed to provide commercial polybutene. It has now been found that butene-1 can be polymerized to useful high molecular weight isotactic polymers in the presence of a novel catalyst comprising a titanium chloride, a trialkyl aluminum compound and hereinafter defined metals, at much faster rates than when such polymerizations are conducted in the absence of the added metal, and isotactic polymers with improved physical properties are thereby obtained.

The titanium halides of the novel and improved catalyst system of this invention includes titanium trihalides and tetrahalides wherein titanium has a valence of 3 and 4, respectively. Excellent results have been obtained with the chlorides, as titanium tetrachloride.

The trialkyl aluminum component of the catalyst system may be any trialkyl aluminum compound of the formula $R_3Al$ wherein R is a saturated acyclic hydrocarbon radical containing 2 to 10 carbon atoms and including, for example, triethyl aluminum, tripropyl aluminum, triamyl aluminum and the like. Excellent results are obtained with trialkyl aluminum compounds wherein the alkyl groups contain 2 to 4 carbon atoms.

The metal component of the catalyst may be metals of Groups IIB, and IVA of the Periodic Table and mixtures thereof including alloys and amalgams. These groups are based on the conventional long form of the Periodic Table as in the Periodic Chart found on pages 400–401 of the 39th edition (1957–58) of the Handbook of Chemistry and Physics (Chemical Rubber Publishing Company). Useful metals for use in the process of this invention are cadmium, mercury, tin and lead. The metal is preferably in a finely divided form as tin powder. The particles size of the powdered metals will be less than about 100 mesh.

In preparing the catalyst compositions, the ratio of constituents may be varied within the following ranges. Based on one mol of titanium tetrachloride, the trialkyl aluminum compound may be varied from about 0.5 mol to about 5 or even 10 mols. However, it is an unexpected advantage of this invention that the ratio of trialkyl aluminum compound to titanium polyhalide may be quite low. For example, when butene-1 is polymerized with triethyl aluminum and titanium tetrachloride in a molar ratio of about one mole of triethyl aluminum to about one mol of titanium tetrachloride, the polymerization rate is slow, the utimate polymer yield is low and the physical properties of the resulting polybutene polymers are poor. When, however, in accordance with this invention, the catalyst also includes about one-third mol of certain metals per mol of titanium tertachloride, as mercury, increased yield of polybutene having improved physical properties is obtained. Preferably the molar ratio of trialkyl aluminum to titanium tetrachloride is from 1 to 1 to about 4 to 1. The amount of the defined metal employed in the catalyst complex may be varied and while very small amounts of metals will give some improvement, normally an amount from about 0.1 to about one mol, preferably 0.6 mol, of metal per mol of titanium halide will be employed.

In using the catalyst, a number of procedures may be employed. For example, the trialkyl aluminum compound in an inert solvent may be added to a mixture of titanium tetrachloride and metal powder in an inert solvent. The trialkyl aluminum compound and metal may be mixed together in an inert solvent and added to the titanium tetrachloride in an inert solvent, or the titanium halide added to the mixture of aluminum compound and metal, or the three ingredients may be mixed together simultaneously in an inert solvent. Hydrocarbons are normally employed as the inert inorganic solvent. Excellent results are ordinarily obtained when the catalyst is allowed to age for more than about 10 minutes at a temperature above 50° C.

The amount of catalyst used may be varied quite widely and may be as low as 0.01 weight percent based on the weight of the monomer to be polymerized, but normally it will be in the range of about 0.5 to about 5 to 10 weight percent based on the weight of the monomer to be polymerized.

The polymerization of the α-olefin is normally conducted at temperatures below 250° C. and below 150 atmospheres and usually is as temperatures between about 25° C. and 150° C. at about 1 to 50 atmospheres. The improved process of the invention gives excellent results when applied to α-olefins containing 3 to 5 carbon atoms including propene and butene-1, and improved polymerization rates and polymer properties are obtained with these α-olefins as well as mixtures of butene-1 and other olefins including propene, butene-1, 3-methyl butene-1 and the like, including copolymers such as butene-1 with ethylene. The novel catalyst system of this invention is particularly advantageous for copolymerizing diolefins such as butadiene and isoprene with α-olefins and the novel catalyst system may be used in both batch and continuous polymerization processes.

The polymerization reactions normally will be conducted with an inert diluent such as heptane, isooctane, cyclohexane, benzene, toluene and the like.

The polymer formed in accordance with the process of this invention is recovered after stopping the polymerization by deactivating the catalyst as with an alcohol. The polymer is then separated, washed and dried.

*Examples 1 through 4*

In these examples the catalyst was prepared by adding to a stirred reaction flask 24 millimols of titanium tetrachloride and 8 millimols of the hereinafter designated metals in 200 milliliters of heptane, and over a period of about 20 minutes at 90° C. to 95° C., 26 millimols of triethyl aluminum in 200 milliliters of heptane was added thereto and the resulting mixture aged for 20 minutes.

Butene-1 was added gradually (3.0 grams per minute at atmospheric pressure) and intermittently so as to maintain a polymerization temperature of 66° C. to 75° C. The polymerization reaction was terminated after four hours by adding 25 milliliters of methanol to the reaction mixture. The polymer was purified by taking it up in toluene, washing with aqueous HCl and then water, and the polymer was then precipitated from toluene with methanol and dried. The yield of polybutene obtained and percent ether insolubles are set forth below.

| Example | Metal | Grams | Ether insolubility, percent |
|---|---|---|---|
| 1 | Mercury | 185 | 69 |
| 2 | Tin | 148 | 68 |
| 3 | None | 80 | 65 |

The increase in yield is shown by the data. The increase in isotacticity in the polybutene is indicated by the increase in percent ether insolubility of the polybutene prepared in the presence of the designated metals as compared to polybutene prepared in the absence of such metals. This novel catalyst is particularly advantageous for copolymerizing α-olefins containing 3 to 4 carbon atoms and diolefins including butadiene-1,3 and isoprene. These monomers polymerize very readily with this catalyst at triethyl aluminum to titanium tetrachloride molar ratios of 0.5 to 1 to 1.5 to 1. Without the metal additive, copolymers of α-olefins such as butene-1 are obtained in low yields only at these low catalyst ratios.

The improved polymers obtained in accordance with the process of this invention find many commercial uses. Poly(butene-1) so prepared is readily formed into valuable pipe and film materials.

We claim:

1. A method for polymerizing alpha-olefins which comprise contacting said alpha-olefins with a catalyst comprising a trialkyl aluminum compound, a titanium polyhalide wherein titanium has a valence of 3 to 4 and a finely divided metal selected from the group consisting of cadmium, mercury, tin, and lead in a molar ratio of one mol of titanium polyhalide, 0.5 to 10 mols trialkyl aluminum and 0.1 to one mol of metal.

2. A method for polymerizing alpha-olefins containing 3 to 4 carbon atoms which comprises contacting said alpha-olefins with a catalyst consisting essentially of titanium tetrachloride, a trialkyl aluminum compound wherein the alkyl groups contain 2 to 4 carbon atoms and a finely divided metal selected from the group consisting of cadmium, mercury, tin, and lead in a molar ratio of one mol of titanium tetrachloride, 0.5 to 4 mols of trialkyl aluminum, and from about 0.1 to about 0.6 mol of metal.

3. The method of claim 2 wherein the alpha-olefin is butene-1.

4. The method of claim 3 wherein the metal is mercury.

5. The method of claim 3 wherein the metal is tin.

6. A catalyst for polymerizing alpha-olefins comprising a trialkyl aluminum compound, a titanium polyhalide wherein titanium has a valence of 3 to 4 and a finely divided metal selected from the group consisting of cadmium, mercury, tin, and lead, in molar ratio of one mol of titanium polyhalide, 0.5 to 10 mols of trialkyl aluminum, 0.1 to one mol of metal.

7. A catalyst for polymerizing alpha-olefins consisting essentially of titanium tetrachloride, a trialkyl aluminum compound wherein the alkyl group contains 2 to 4 carbon atoms and mercury, in a molar ratio of one mol of titanium tetrachloride, 0.5 to 4 mols of trialkyl aluminum, and 0.1 to 0.6 mol of mercury.

8. A catalyst for polymerizing alph-olefins consisting essentially of titaniumtetrachloride, a trialkyl aluminum compound wherein the alkyl groups contain 2 to 4 carbon atoms and tin, in a molar ratio of one mol of titanium tetrachloride, 0.5 to 4 mols of trialkyl aluminum, and 0.1 to 0.6 mol of tin.

References Cited by the Examiner

UNITED STATES PATENTS

| 2,928,815 | 3/60 | Hammer | 260—93.7 |
| 2,980,662 | 4/61 | Jezl | 260—88.2 |
| 3,086,964 | 4/63 | Joyner | 260—94.9 |

FOREIGN PATENTS 837,251  6/60  Great Britain.

JOSEPH L. SCHOFER, *Primary Examiner.*

M. LIEBMAN, *Examiner.*